United States Patent [19]
Shintomi

[11] Patent Number: 5,598,089
[45] Date of Patent: Jan. 28, 1997

[54] SECONDARY BATTERY CHARGING APPARATUS

[75] Inventor: Yuichi Shintomi, Kyoto, Japan

[73] Assignee: Rohm Co., Ltd., Kyoto, Japan

[21] Appl. No.: 429,474

[22] Filed: Apr. 27, 1995

[30] Foreign Application Priority Data

Apr. 28, 1994 [JP] Japan ................... 6-090962

[51] Int. Cl.⁶ ....................................... H02J 7/00
[52] U.S. Cl. .............................. 320/56; 307/66
[58] Field of Search ............... 320/5, 9, 10, 56; 307/66, 85, 86

[56] References Cited

U.S. PATENT DOCUMENTS 5,371,456  12/1994  Brainard ............................... 320/31
5,389,825  2/1995   Ishikawa et al. ................... 307/10.1
5,418,445  5/1995   Alpert et al. ....................... 307/66 X
5,420,496  5/1995   Ishikawa ............................. 320/56

*Primary Examiner*—Peter S. Wong
*Assistant Examiner*—Patrick B. Law
*Attorney, Agent, or Firm*—Nikaido, Marmelstein, Murray & Oram LLP

[57] ABSTRACT

A charging apparatus has a controller which controls the charging and discharging of a secondary battery. The controller has a power changeover circuit which makes a changeover so that when a charging DC power source from an AC adapter is present, the charging DC power source is used as the power source of the controller and that when the charging DC power source from the AC adapter is absent with the secondary battery being set, the secondary battery is used as the power source of the controller.

5 Claims, 3 Drawing Sheets

SECONDARY BATTERY CHARGING APPARATUS

BACKGROUND OF THE INVENTION

1. Field of the Invention

The present invention relates to a charging apparatus for charging a secondary battery such as a nickel-cadmium battery and a nickel-hydrogen battery.

2. Description of the Prior Art

Since secondary batteries used for portable electronic apparatuses are rechargeable, several charging apparatuses have been proposed for charging them. The voltage of a charged secondary battery decreases as the battery is used. It is known that if recharging before the battery is completely discharged is repeated several times, because of the memory function of the secondary battery, the battery cannot be used at voltages lower than the battery voltage of just before the recharging.

For example, referring to the characteristic of FIG. 3 in which the axis of abscissas represents the time and the axis of ordinate represents the battery voltage, if the use of the battery is stopped at A and the battery is recharged there, the battery cannot be used in the right voltage range exceeding the voltage at A. This means that the battery cannot be used in the voltage range between 1.2 V and 1.0 V on the right side of A (1.2 V) while the usable voltage range of one secondary battery is between 1.6 V and 1.0 V.

To solve this problem, when the battery is recharged at A, it is typical that the battery voltage is decreased to 1 V by discharging before the battery is recharged (the voltage may be decreased every time the battery is recharged or every several times). Thus, to recharge the secondary battery, it is necessary to discharge it before recharging it.

Therefore, the charging apparatus is provided with a discharging mechanism in addition to a charging mechanism. The charging apparatus typically has a controller to control the charging and discharging. As the power source for the controller, a DC (direct current) power source from an AC (alternating current) adapter is used. When the AC adapter is not connected to the commercial AC power source, since no DC power source from the AC adapter is present, the charging and discharging cannot be controlled.

In the case of the charging, the controller is supplied with power since the AC adapter is always connected to the commercial AC power source. However, in the case of the discharging, since it is unnecessary to supply power from the commercial AC power source through the AC adapter, the AC adapter is usually disconnected from the commercial AC power source. Therefore, the controller is deactivated so that the discharging cannot be controlled. To control the discharging, the AC adapter is necessarily connected to the commercial AC power source. In other words, discharging cannot be performed without the commercial AC power source.

In charging, since charging can be performed after discharging is performed, there may not be so frequent occasions when it is necessary to independently perform discharging. However, when it is necessary to independently perform discharging, in the conventional apparatus, discharging cannot be performed without the power from the AC adapter. The secondary battery may be discharged by a mechanical switch even if there is no power from the AC adapter and the controller is deactivated. However, this requires an extra operation, and in the case of the secondary battery, since it is dangerous to discharge the battery to a voltage below a predetermined lower limit, it is preferable to perform discharging under control of the controller.

SUMMARY OF THE INVENTION

An object of the present invention is to provide a secondary battery discharging apparatus in which even when there is no power from the AC adapter, the controller can be operated to control discharging.

To achieve the above-mentioned object, according to the present invention, in a charging apparatus having a controller which controls charging and discharging of a secondary battery, the controller is provided with a power source changeover circuit which makes a changeover of a power source so that when a charging DC power source from an AC adapter is present, the charging DC power source is used as a power source for the controller and that when the charging DC power source from the AC adapter is not present under a condition where the secondary battery is set, the secondary battery is used as the power source for the controller.

Moreover, a controller according to the present invention is provided with a terminal for outputting a control signal for controlling a charging line and a discharging line of the secondary battery, a first input terminal for inputting a voltage from the charging line, a second input terminal for inputting a voltage from the secondary battery, and a changeover circuit which selects a voltage applied to the first input terminal when the voltage is applied to the first input terminal and selects a voltage at the second input terminal when no voltage is present at the first input terminal and the voltage is present at the second input terminal. The controller operates by using an output of the changeover circuit as a power source.

According to such features, the controller operates on the power source from the AC adapter as far as the power source from the AC adapter is present. However, even if the power source from the AC adapter is absent, if the secondary battery in the charging apparatus is set, the controller operates on the secondary battery. In this case, if the secondary battery is detached from the apparatus, the controller is inoperable.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
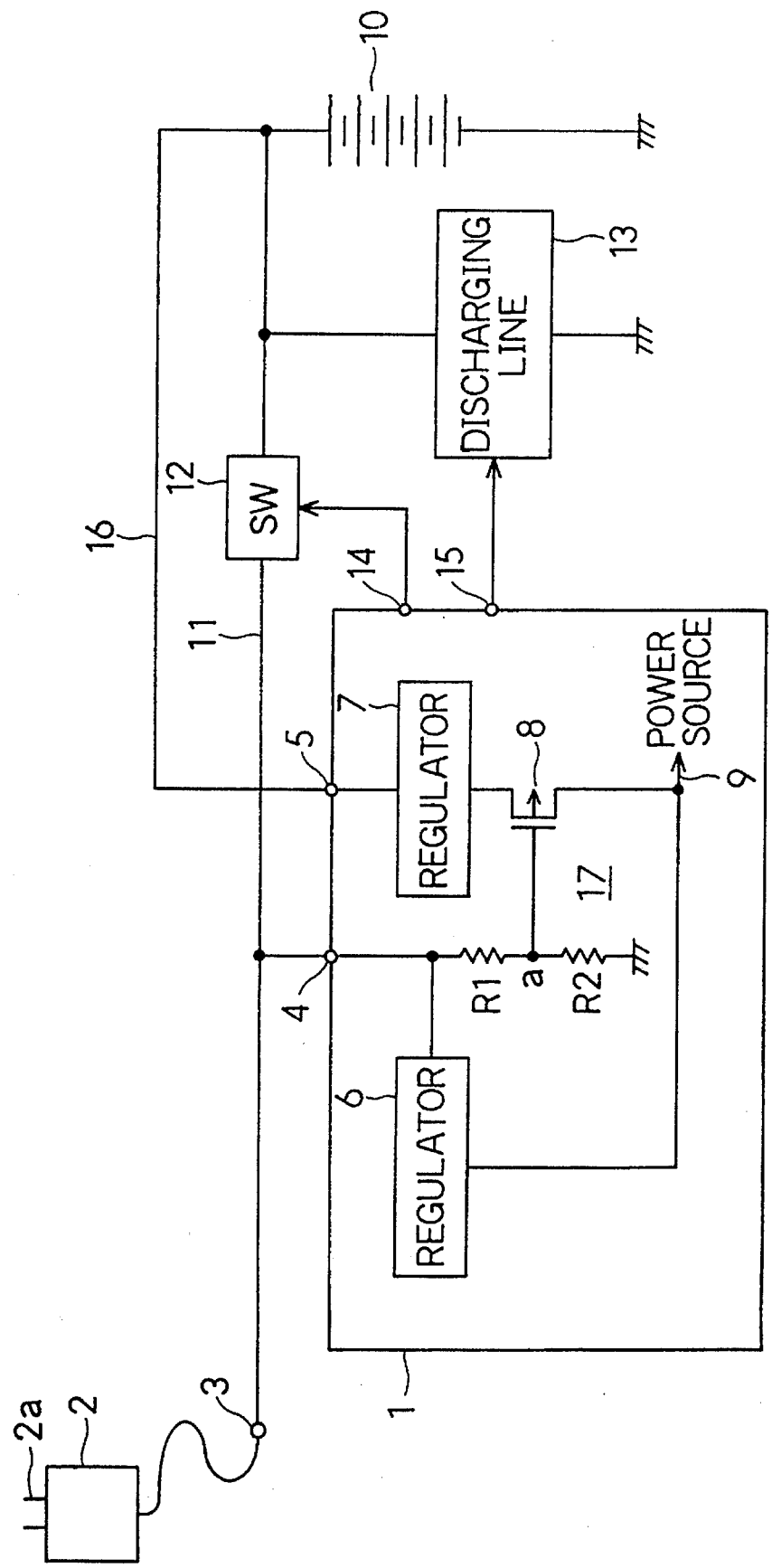
FIG. 1 is a circuit diagram showing the arrangement of a relevant portion of a charging apparatus embodying the present invention.
Figure 2:
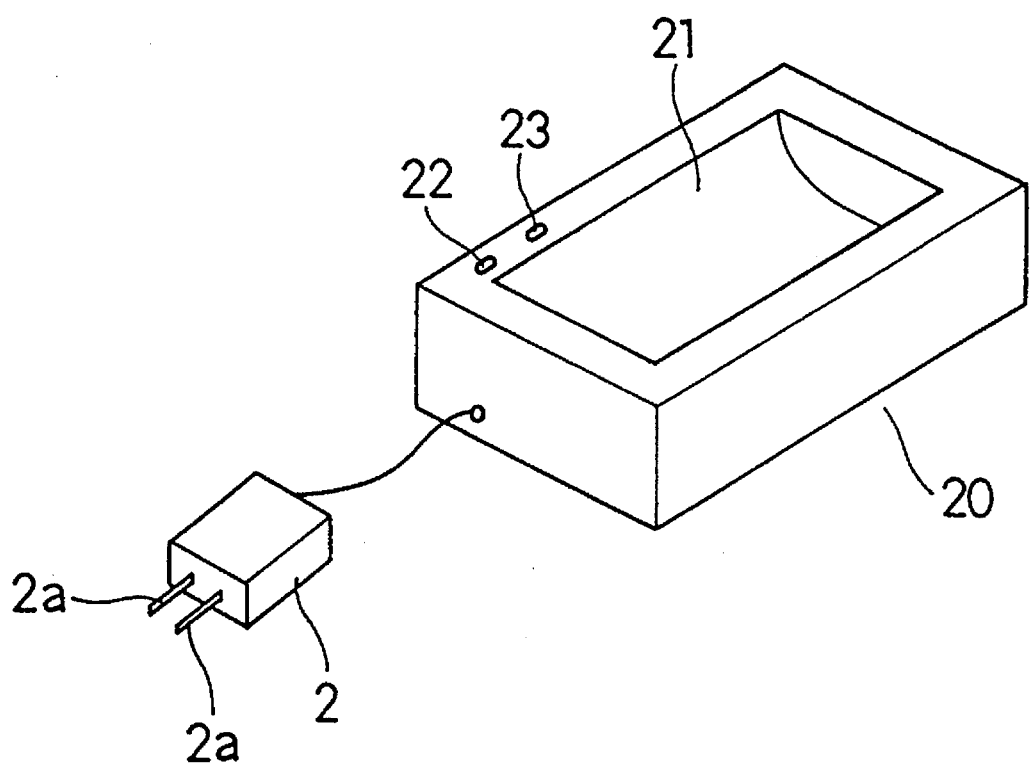
FIG. 2 schematically shows the appearance of the charging apparatus.
Figure 3:
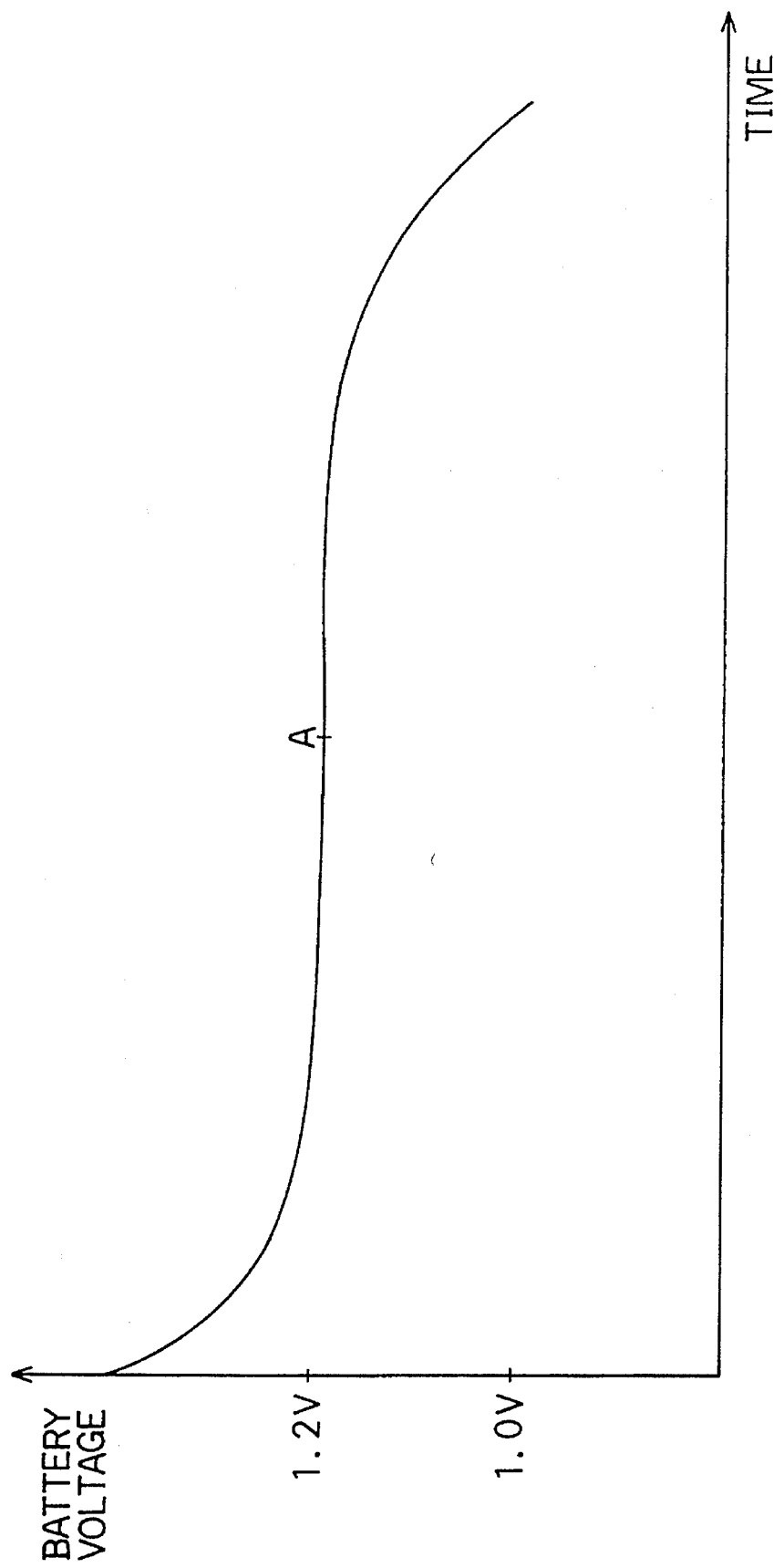
FIG. 3 is a view of assistance in explaining a characteristic of a secondary battery.

Hereinafter, an embodiment of the present invention shown in the drawings will be described. Referring to FIG. 1, there is shown a block circuit diagram of a relevant portion of a charging apparatus 20 shown in FIG. 2. Reference numeral 1 represents a controller comprising a one-chip microcomputer. Reference numeral 2 represents an AC adapter connected to the commercial AC power source.

Reference numeral 3 represents a terminal for connecting the AC adapter 2 to the charging apparatus 20.

An output of the AC adapter 2 which converts AC into DC is coupled to a charging line 11 through the terminal 3, and a switch circuit 12 which cuts off/passes current flowing through the charging line 11 is inserted in the charging line 11. The output side of the switch circuit 12 is connected to secondary batteries 10. Five secondary batteries 10 are set in series in a recess 21 of the charging apparatus 20 shown in FIG. 2. The recess 21 may be formed so that the number of secondary batteries which can be set in the recess 21 is other than five.

A discharging line 13 is provided to be parallel to the secondary batteries 10. The switch circuit 12 and the discharging line 13 are controlled by a charging control signal and a discharging control signal supplied through output terminals 14 and 15 of the controller 1. The charging line 11 is connected to a first input terminal 4 of the controller 1. The first input terminal 4 is connected to a voltage regulator 6 provided in the controller 1 and to a series circuit including resistors R1 and R2.

Reference numeral 5 represents a second input terminal connected to the secondary batteries 10 through a line 16. In the controller 1, the second input terminal 5 is connected to the source of a P-channel MOS (metal oxide semiconductor) transistor 8 through a voltage regulator 7. The drain of the transistor 8 is connected to a power line 9 provided in the controller 1. An output of the voltage regulator 6 is also coupled to the power line 9. The transistor 8 and the resistors R1 and R2 constitute a power changeover circuit 17. The maximum and minimum voltages of each secondary battery 10 are 1.6 V and 1 V, respectively. In the case of five batteries, the maximum voltage is 8 V and the minimum voltage is 5 V.

Subsequently, an operation of the circuit of FIG. 1 will be described. Assume now that the AC adapter 2 is connected to the commercial AC power source. A DC voltage outputted from the AC adapter 2 is supplied to the voltage regulator 6 through the first input terminal 4. After regulated to 5 V, the output is directed to the power line 9. At this time, the voltage that appears at a is the DC output voltage from the AC adapter divided by the resistors R1 and R2. This voltage is applied to the gate of the transistor 8. As a result, the transistor 8 is disabled.

Therefore, when a DC voltage is outputted from the AC adapter 2, the controller 1 operates on the power from the AC adapter 2. To charge the secondary batteries 10 under this condition, a charging control signal is generated by the controller 1 at the terminal 14 to turn on the switch 12, so that the secondary batteries 10 are charged by direct currents from the AC adapter 2. To discharge the batteries 10, a discharging control signal is generated at the terminal 15 to activate the discharging line 13, so that the batteries 10 are discharged. The trigger of the charging is obtained by an operation of an operation member 22. The trigger of the discharging is obtained by an operation of an operation button 23.

In order for the charging and discharging to be performed appropriately, it is necessary to supply the controller 1 with information on the voltage across the secondary batteries 10. A circuit which detects the voltage across the batteries 10 is not shown. When the AC adapter 2 is connected to the commercial AC power source, even if the secondary batteries 10 are detached from the charging apparatus 20, the controller 1 is supplied with power to be activated. However, since a plug 2a of the AC adapter 2 is usually disconnected from an outlet of the commercial AC power source when the secondary batteries 10 are detached, the controller 1 is usually deactivated accordingly.

When the secondary batteries 10 are set in the recess 21 of the charging apparatus 20 without the AC adapter 2 being connected to the commercial power source, the DC voltage of the secondary batteries 10 is applied to the second input terminal 5 through the line 16. At this time, since no voltage is applied to the first input terminal 4, the potential of the gate of the transistor 8 is the ground potential. For this reason, the transistor 8 is activated, so that a voltage from the voltage regulator 7 is supplied to the power line 9 to activate the controller 1. In this case, discharging can be performed independently without charging being performed.

While the charging apparatus 20 is an independent apparatus in the above-described embodiment, this may be provided in a portable electronic apparatus. Moreover, the charging apparatus provided in the portable electronic apparatus may be designed so that the secondary batteries cannot be attached and detached.

As described above, according to the present invention, in discharging secondary batteries, the controller can be driven by using the secondary batteries, so that the secondary batteries can be discharged without the commercial AC power source. Further, since the changeover of the power source of the controller between when the AC adapter is connected to the commercial AC power source and when it is not connected is automatically performed by the controller itself, the user does not have to perform any extra operation. In addition, since the controller controls both charging and discharging, if the controller is in the form of an integrated circuit, a one-chip controller capable of charging, discharging and changeover between the power source is realized.

Obviously, many modifications and variations of the present invention are possible in light of the above teachings. It is therefore to be understood that within the scope of the appended claims, the invention may be practiced other than as specifically described.

What is claimed is:

1. A charging apparatus having a controller which controls charging and discharging of a secondary battery, wherein said controller is provided with a power source changeover circuit which makes a changeover of a power source so that when a charging DC power source from an AC adapter is present, the charging DC power source is used as a power source for the controller and that when the charging DC power source from the AC adapter is not present under a condition where the secondary battery is set to the charging apparatus, the secondary battery is used as the power source for the controller.

2. A controller which controls charging and discharging of a secondary battery, said controller comprising:

a terminal for outputting a control signal for controlling a charging line and a discharging line of the secondary battery;

a first input terminal for inputting a voltage from the charging line;

a second input terminal for inputting a voltage from the secondary battery; and a changeover circuit which selects a voltage applied to the first input terminal when the voltage is applied to the first input terminal and selects a voltage at the second input terminal when no voltage is present at the first input terminal, wherein said controller operates by using an output of the changeover circuit as a power source.

3. A controller according to claim 2, wherein said controller is formed by a semiconductor integrated circuit.

4. A controller according to claim 2, wherein said changeover circuit includes means for connecting the first input terminal to a power line of the controller, a resistor circuit connected to the first input terminal and to a ground potential point, a switching transistor whose control electrode is connected to the resistor circuit, and means for connecting the first input terminal and the power line through the switching transistor, and wherein when the voltage is supplied to the first input terminal, the switching transistor is deactivated by a voltage generated at the resistor circuit, so that the voltage from the first input terminal is supplied to the power line, and when the voltage is not supplied to the first input terminal, the switching transistor is activated, so that the voltage at the second input terminal is supplied to the power line.

5. A controller according to claim 4, wherein said controller is formed by a semiconductor integrated circuit.

* * * * *